United States Patent [19]
Salem et al.

[11] Patent Number: 5,623,615
[45] Date of Patent: Apr. 22, 1997

[54] CIRCUIT AND METHOD FOR REDUCING PREFETCH CYCLES ON MICROPROCESSORS

[75] Inventors: Gaby J. Salem, Coral Springs; Terry L. Weakley, Boca Raton, both of Fla.

[73] Assignee: International Business Machines Corporation, Armonk, N.Y.

[21] Appl. No.: 285,785

[22] Filed: Aug. 4, 1994

[51] Int. Cl.$^6$ .................................................. G06F 9/38
[52] U.S. Cl. .................. 395/585; 364/231.8; 364/261.3; 364/261.7; 395/383
[58] Field of Search ............................................. 395/375

[56] References Cited

U.S. PATENT DOCUMENTS

| | | |
|---|---|---|
| 4,873,627 | 10/1989 | Baum et al. . |
| 4,933,837 | 6/1990 | Freidin . |
| 5,101,341 | 3/1992 | Circello et al. . |
| 5,136,697 | 8/1992 | Johnson . |
| 5,214,766 | 5/1993 | Liu . |

FOREIGN PATENT DOCUMENTS

| | | |
|---|---|---|
| 371418 | 6/1990 | European Pat. Off. . |
| 417013 | 3/1991 | European Pat. Off. . |
| 4-239323 | 8/1992 | Japan . |
| 4-369061 | 12/1992 | Japan . |
| WO91/04536 | 4/1991 | WIPO . |

OTHER PUBLICATIONS

"Branch Prediction Strategies and Branch Target Buffer Design", Lee, Johnny K.F. and Smith, Alan Jay, *IEEE Computer*, Jan., 1984, pp. 6–22.

"Intel Reveals Pentium Implementation Details", Case, Brian, *Microprocessor Report*, Mar. 29, 1993; pp. 9–17.

Intel's *Pentium Processor User's Manual*, vol. 1, 1993, Chapter 2: "Microprocessor Architecture Overview".

"Reducing Instruction Cache Reload Latency," IBM Corp. Technical Disclosure Bulletin, vol. 32, No. 4B, Sep., 1989, p. 229.

"Integral Instruction Fetch Line Buffer in Cache," IBM Corp. Technical Disclosure Bulletin, vol. 35, No. 1A, Jun., 1992, pp. 27–28.

*Primary Examiner*—Krisna Lim
*Attorney, Agent, or Firm*—William N. Hogg; George E. Grosser

[57] ABSTRACT

An enhanced microprocessor (278) (FIG. 6) having a first portion (153) (FIG. 7) and a second portion (196) (FIG. 8) configured to eliminate prefetching of instructions from an instruction cache (102) (FIG. 6) when the required instructions are already present within a prefetch buffer (104) (FIG. 6). The first portion (153) and second portion (196) are in circuit communication with a prefetch buffer (104) (FIG. 6), branch target cache (108) (FIG. 6), control unit (110) (FIG. 6), and execution unit (112) (FIG. 6). The first portion (153) is responsive to forward or backward branch instructions that have a branch target within the same prefetch buffer, and to forward branch instructions that have a branch target within a next successive prefetch buffer. The first portion (153) is configured to inhibit prefetching of instructions when such conditions are present. The second portion (196) is responsive to backward branch instructions that have a branch target within an immediately preceding prefetch buffer and configured to assert a prefetch inhibit signal to prevent any further prefetching of instructions.

19 Claims, 8 Drawing Sheets

CIRCUIT AND METHOD FOR REDUCING PREFETCH CYCLES ON MICROPROCESSORS

FIELD OF THE INVENTION

The present invention relates generally to microprocessor design and, more specifically, to a circuit and method for reducing the power consumed by superscalar processors having prefetch buffers, an instruction cache, and a branch target cache with history bits by reducing unnecessary prefetch accesses to the instruction cache.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that are comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (IBM PC/AT), IBM's PERSONAL SYSTEM/1 (IBM PS/1), and IBM's PERSONAL SYSTEM/2 (IBM PS/2).

Personal computer systems are typically used to run software to perform such diverse activities as word processing, manipulation of data via spread-sheets, collection and relation of data in databases, displays of graphics, design of electrical or mechanical systems using system-design software, etc.

The heart of such systems is the microprocessor or central processing unit (CPU) (referred to collectively as the "processor.") The processor performs most of the actions responsible for application programs to function. The execution capabilities of the system are closely tied to the CPU: the faster the CPU can execute program instructions, the faster the system as a whole will execute.

Early processors executed instructions from relatively slow system memory, taking several clock cycles to execute a single instruction. They would read an instruction from memory, decode the instruction, perform the required activity, and write the result back to memory, all of which would take one or more clock cycles to accomplish.

As applications demanded more power from processors, internal and external cache memories were added to processors. A cache memory (hereinafter cache) is a section of very fast memory located within the processor or located external to the processor and closely coupled to the processor. Blocks of instructions are copied from the relatively slower system DRAM to the faster caches where they are executed by the processor.

As applications demanded even more power from processors, superscalar processors were developed. A superscalar processor is a processor capable of executing more than one instruction per clock cycle. A well-known example of a superscalar processor is manufactured by Intel Corp. under the trademark PENTIUM. The PENTIUM processor uses prefetch buffers, an instruction cache, and a branch target cache to reduce fetches to the memory, which tend to slow the processor down to less than one instruction per clock cycle.

The instruction cache is a section of very fast memory located within the processor. Instructions execute out of the instruction cache very quickly. Instruction blocks are moved from the slower system memory to the instruction cache, where the processor's buffers, decoders and execution units can quickly access them.

An instruction cache speeds up processing if the next instruction to be executed is within the cache. However, if the current instruction being executed is an instruction that might cause a branch in the code, then the probability that the subsequent instruction is in the instruction cache decreases dramatically and the processor slows down significantly because a branch to an area outside the cache causes the processor to execute code from the relatively slower system DRAM until the cache is loaded with a block of code from the slower DRAM.

The branch target caches, also known as branch target buffers, are a common solution to the problem of branches causing a read from slower system DRAM. Branch target circuits are well known in the art. E.g., *Pentium Processor User's Manual*, vol. 1, Intel Corp., 1993; Brian Case, "Intel Reveals Pentium Implementation Details," *Microprocessor Reports*, Mar. 29, 1993, at 9; J. Lee & A. J. Smith, "Branch Prediction Strategies and Branch Target Buffer Design," *IEEE Computer*, Jan. 1984, at 6.

Branch target caches hold information helpful in avoiding undesirable executions from the slower system DRAM. They hold data such as the predicted target address and history bits that give some indication of whether a particular predicted target address was taken or not taken in the past (in the case of the PENTIUM processor) and the first several lines of code at the predicted address (in the case of the Am29000 processor, manufactured by Advanced Micro Devices, Inc.). Using a branch target cache allows the processor to fetch a portion of the code at the predicted target address allowing the fetcher time to load a larger portion of that area of memory into the instruction cache, thereby allowing continued execution from the cache and preventing unneeded execution from slower system DRAM.

The prefetch buffers are buffers that store a line of code containing one or more instructions. During cache access cycles, if the line of code that is to be executed next is present in the cache, then it is moved into the prefetch buffers for decoding by the instruction decoder. If the line of code that is to be executed next is not present in the cache, then the instruction is fetched from the slower DRAM and loaded into the prefetch buffer for decoding by the instruction decoder.

Using these components, processors achieve very fast execution times. As desirable as the processing capability of these processors are, they tend to consume a large amount of electrical power. The processors access the instruction cache and branch target cache very often to prevent unnecessary accesses to the slower system DRAM; however, the power consumed by a cache is directly proportional to the bandwidth of the cache (the bandwidth is defined as the number of accesses per unit time, for example, accesses per second). Thus, the more often the cache is accessed, the more power the processor consumes. Therefore, the increase in performance caused by the use of the caches is accompanied by an increase in the power consumed by the processor. This consumption of power has numerous detrimental effects including the possibility of causing the entire processor to overheat and fail, thereby leading to irreparable data loss in some cases.

Prior attempts to reduce the power consumed by such processors tend to focus on removing power to certain subcircuits within the processor or stretching the CPU clock (i.e., causing less instructions to be executed per clock cycle than normal). By employing such techniques, manufactures have labeled their personal computer systems as "green" machines, indicating that their computer systems are environmentally desirable because they consume less electrical energy than other similar systems. These attempts to reduce the electrical power consumed are successful but have the undesirable side-effect of reducing power at the expense of reduced processor performance.

Therefore, it is a principle object of the present invention to reduce the amount of electrical power consumed by superscalar processors without causing a similar reduction in processor performance.

SUMMARY OF THE INVENTION

According to the present invention, a circuit and method are provided for reducing the power consumed by superscalar processors without a significant reduction in performance capabilities by reducing unnecessary prefetch accesses to the caches. The less often the instruction cache and branch target cache are accessed, the lower the power consumed by the processor will be.

The circuitry makes use of the buffer length found in typical prefetch buffers in processors such as the PENTIUM processor. For each branching instruction, the instruction cache and branch target cache are accessed to determine whether the address of the predicted branch target is present in the branch target cache and whether a block of code containing the instructions at the branch target address is present in the instruction cache. These accesses consume a great deal of power. In the circuit of the present invention, power is conserved without an accompanying reduction in processor power by adding circuitry to prevent cache prefetches when the instruction to be branched to is currently in the prefetch buffers.

It is therefore an advantage of the present invention to prevent unnecessary accesses of the instruction cache.

It is another advantage of the present invention to provide a circuit and method for reducing the power consumed in a processor by preventing unnecessary prefetches from the instruction cache.

It is a further advantage of the present invention to provide a computer system that has the environmentally desirable quality of low electrical energy consumption without a reduction in system performance.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

Figure 1:
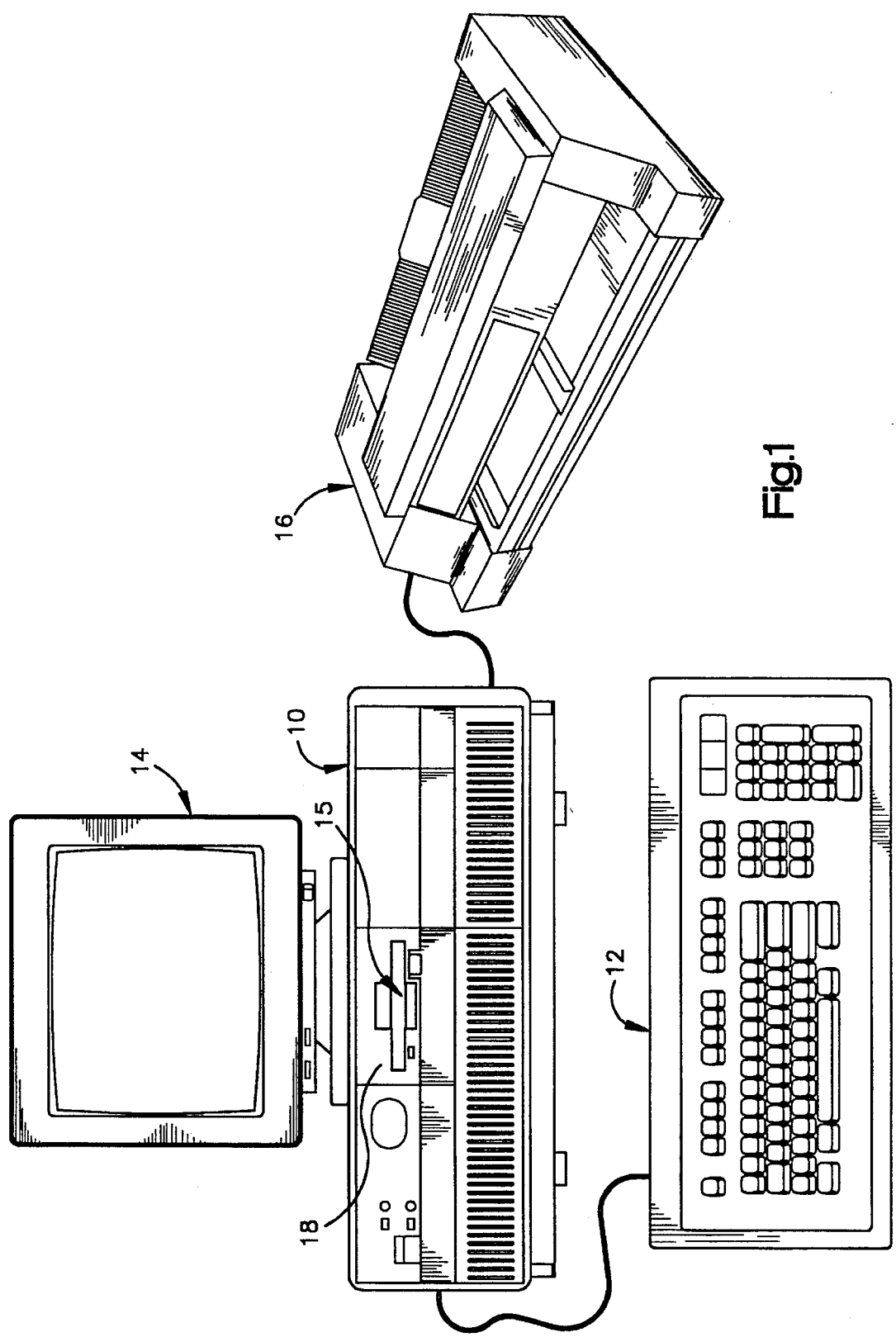
FIG. 1 is a perspective view of a personal computer incorporating the enhanced superscalar microprocessor of the present invention.

Referring now to the drawings, and for the present to FIG. 1, a microcomputer embodying the enhanced superscalar microprocessor of the present invention is shown and generally indicated at 10. The computer 10 has an associated monitor 14, keyboard 12 and printer or plotter 16.

Figure 2:
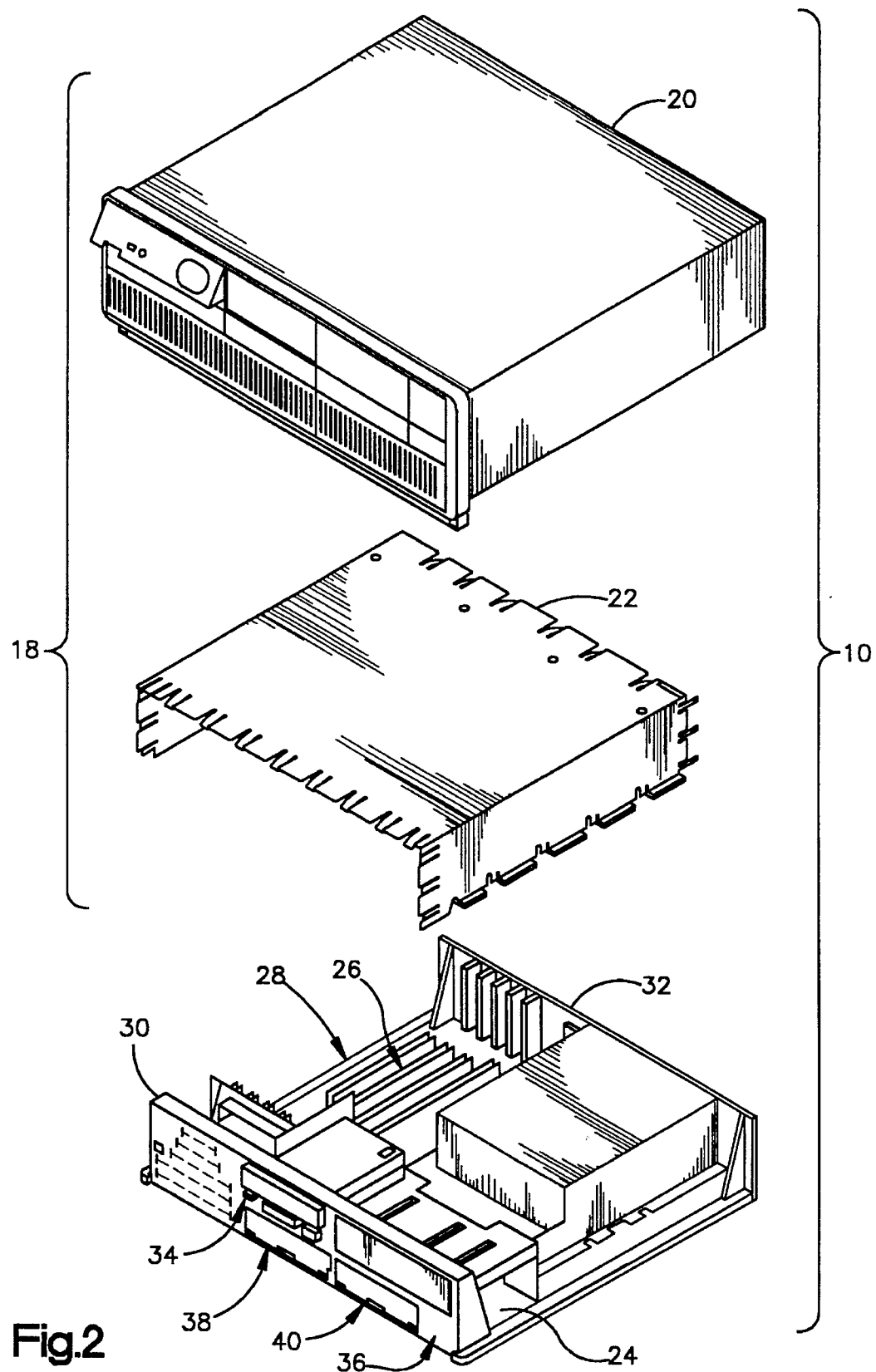
FIG. 2 is an exploded perspective view of certain elements of the personal computer of FIG. 1 including a chassis, a cover, an electromechanical direct access storage device and a planar board, illustrating certain relationships among those elements.

Referring now to FIG. 2, the computer 10 has a cover 18 formed by a decorative outer member 20 and an inner shield member 22 which cooperate with a chassis 28 in defining an enclosed, shielded volume for receiving electrically powered data processing and storage components for processing and storing digital data. At least certain of these components are mounted on a multi-layer planar board 26 or mother board which is mounted on the chassis 28 and provides a structure for electrically interconnecting the components of the computer 10 including those identified above and such other associated elements as floppy disk drives, various forms of direct access storage devices, accessory cards or boards, and the like. As pointed out more fully hereinafter, provisions are made in the planar board 26 for the passage of input/output signals to and from the operating components of the microcomputer.

Still referring to FIG. 2, the chassis 28 has a base indicated at 24, a front panel indicated at 30, and a rear panel indicated at 32. The front panel 30 defines at least one open bay (and in the form illustrated, four bays) for receiving a data storage device such as a disk drive for magnetic or optical disks, a tape backup drive, or the like. In the illustrated form, a pair of upper bays 34, 36 and a pair of lower bays 38, 40 are provided. One of the upper bays 34 is adapted to receive peripheral drives of a first size (such as those known as 3.5 inch drives) while the other bay 36 is adapted to receive drives of a selected one of two sizes (such as 3.5 and 5.25 inch) and the lower bays are adapted to receive devices of only one size (3.5 inch). One floppy disk drive is indicated at 15 in FIG. 1, and is a removable media direct access storage device capable of receiving a diskette inserted thereinto and using the diskette to receive, store and deliver data as is generally known.

Figure 3:
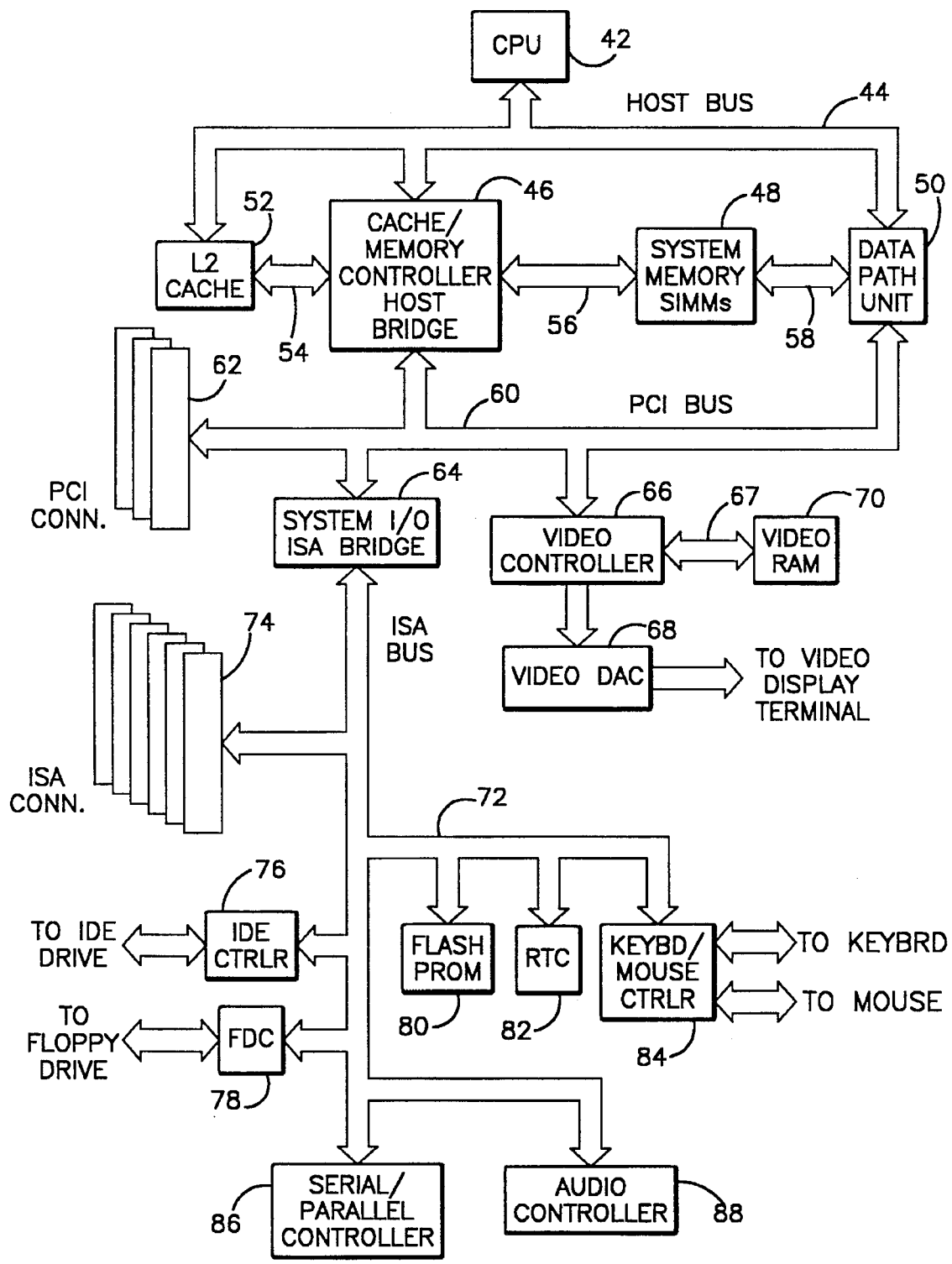
FIG. 3 is a schematic view of certain components of the personal computer of FIGS. 1 and 2.

Prior to relating the above structure to the present invention, a summary of the general operation of the personal computer system 10 merits review. Referring to FIG. 3, there is shown a block diagram of a personal computer system illustrating the various components of the computer system 10 in accordance with the present invention, including components mounted on the planar 26 (shown in FIG. 2) and the connection of the planar to the input/output (I/O) slots and other hardware of the personal computer system. Connected to the planar board 26 (shown in FIG. 2) is the system processor 42. In the illustrated embodiment, the CPU 42 is the PENTIUM processor which is sold by Intel Corp. The CPU 42 is connected by a high speed CPU host bus 44 to a cache/memory controller and host bridge 46, data path unit 50, and second level cache memory (L2 cache) 52.

The cache/memory controller and host bridge 46 is connected to L2 cache 52 via a bus 54 and to a system memory 48 via a bus 56. The cache/memory controller and host bridge 46 integrates the L2 cache 52 and system memory 48 control functions and provides address paths and bus controls for transfers between the Host (CPU 42), system memory 48, and a Peripheral Component Interconnect (PCI) bus 60. The PCI bus 60 employs a 32 bit data bus that supports multiple peripheral components and add-in cards.

During bus operations between the Host (CPU 42), system memory 48, and PCI bus 60, the cache/memory controller and host bridge 46 provides the address paths and bus controls. The cache/memory controller and host bridge 46 also controls data flow through the data path unit 50.

The data path unit 50 provides data path connections between the Host (CPU 42), system memory 48, and PCI bus 60. The system memory 48 is interfaced to the data path unit 50 via a data bus 58 whereby data is transmitted into and out of the system memory 48. The cache/memory controller and host bridge 46 and the data path unit 50 provide a full function data path connection to the system memory 48 and from the PCI bus 60 to a Host subsystem (CPU 42).

The PCI bus 60 is further connected to a plurality of PCI bus expansion slots 62 (three slots are shown), system I/O bridge controller 64, and video controller 66. The system I/O bridge controller 64 provides a bridge between the PCI bus 60 and an Industry Standard Architecture (ISA) bus 72 (or an Enhanced Industry Standard Architecture bus (EISA); not shown) and integrates many of the common I/O functions found in current ISA (or EISA) based PC systems. The video controller 66, which is associated with a video RAM 70 for storing graphic information via a bus 67, is interfaced to the PCI Bus 60 to allow large amounts of data required for high performance graphics to be transmitted quickly to the video controller 66. Video signals generated by video controller 66 may be passed through a Digital to Analog Converter (DAC) 68 to a video display terminal or other display device.

Various peripheral devices are typically connected to the ISA bus 73, such as ISA expansion slots 74 (6 are shown), IDE hard disk controller 76, floppy disk controller (FDC) 78, flash PROM (BIOS) 80, real time clock 82, keyboard/mouse controller 84, serial/parallel controller 86, and audio controller 88.

While the above description has been described with some particularity, it is to be understood that the present invention may be used in conjunction with other hardware configurations. For example, other peripheral components such an ETHERNET® controller, multimedia controller, or Small Computer System Interface II (SCSI II) controller may be added to PCI bus 60.

Figure 4:
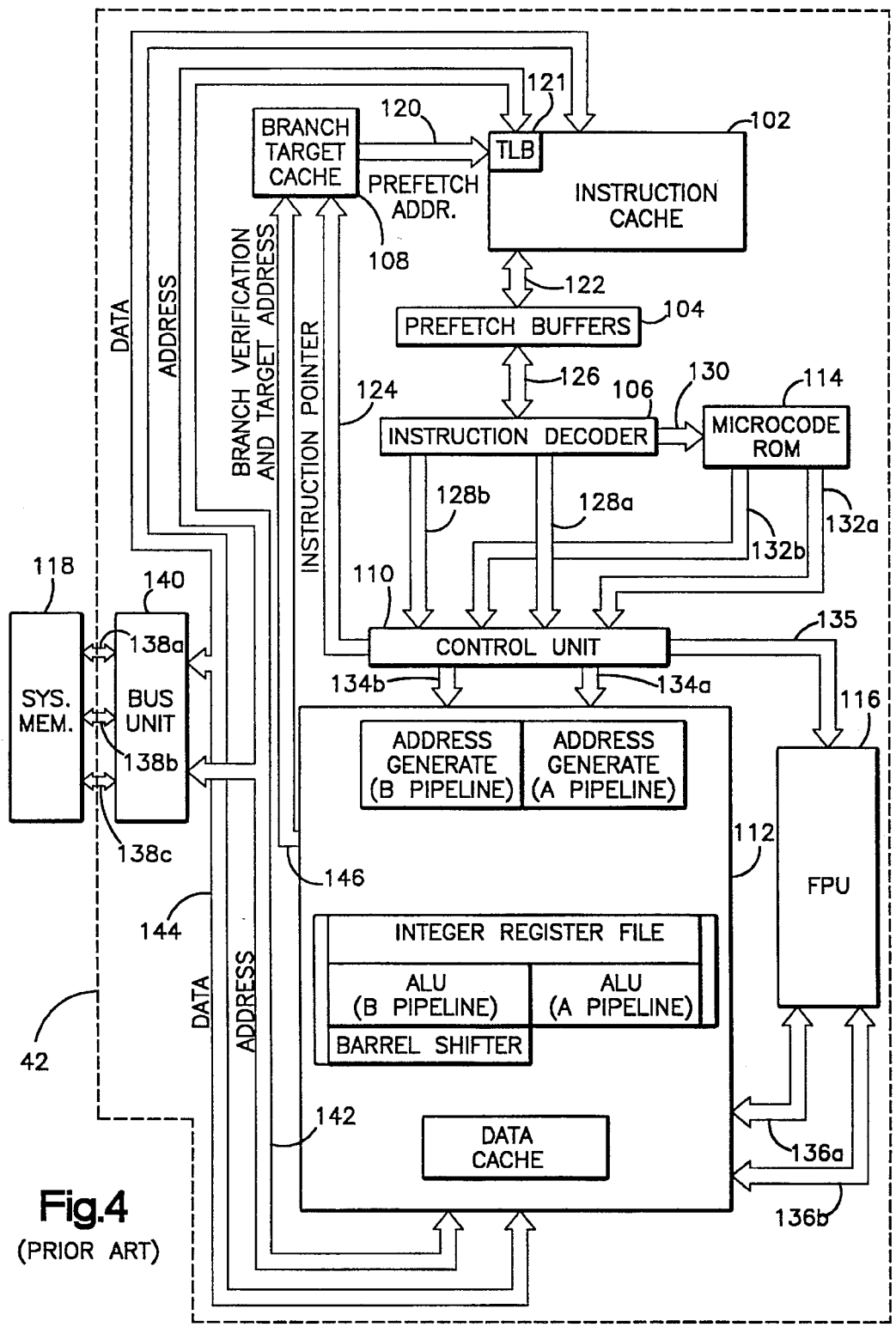
FIG. 4 is a block diagram illustrating the components and interconnections therebetween of a prior art superscalar microprocessor.

Before describing the details of the present invention, a description of a prior art superscalar microprocessor may be helpful in understanding the advantages of the present invention. Reference is had, therefore, to FIG. 4 which shows a prior art superscalar microprocessor 42.

A typical prior art superscalar microprocessor 42 includes an instruction cache 102, instruction decoder 106, branch target cache 108, prefetch buffer 104, control unit 110, execution unit 112, microcode ROM 114, and, optionally, a floating point unit 116 (hereinafter FPU). A system memory 118 is in circuit communication with the instruction cache 102 and execution unit 112.

The instruction cache 102 is in circuit communication with the branch target cache 108, prefetch buffer 104, and the execution unit 112. A plurality of prefetch address lines 120 couple the instruction cache 102, through a translation lookaside buffer 121, to the branch target cache 108 which allows the branch target cache 108 to inquire into the instruction cache 102 to determine if a particular instruction is presently in the instruction cache 102. A plurality of prefetch-cache buffer lines 122 couple the instruction cache 102 to the prefetch buffer 104 and allow fetching of instructions from the instruction cache 102 into the prefetch buffer 104. A plurality of address lines 142 and data lines 144 couple the instruction cache 102 to the system memory 118 via a bus unit 140 to allow fetching of blocks of instruction code into the instruction cache 102 from the system memory 118. The address lines 142 and data lines 144 also couple the execution unit 112 via the bus unit 140 to the system memory 118 for retrieval of data required by the execution unit 112.

The instruction decoder 106 is in circuit communication with the branch target cache 108, control unit 110, prefetch buffer 104, and microcode ROM 114. A plurality of instruction pointer lines 124 couple the control unit 110 to the branch target cache 108. The branch target cache 108 thereby directs sequential block transfers of instruction code from the system memory 118 into the instruction cache 102. A plurality of prefetch-instruction decoder lines 126 connect the instruction decoder 106 to the prefetch buffer 104 which allows instructions presently stored in the prefetch buffer 104 to be loaded into the instruction decoder 106 for decoding into microcode. A plurality of decoder-control unit lines 128A and 128B couple the instruction decoder 106 to the control unit 110 which allows the control unit 110 to manage the sequence of operations that must be performed to implement the processor architecture in accordance with the microcode ROM 114. A plurality of decoder-microcode ROM lines 130 couple the instruction decoder 106 to the microcode ROM 114 to facilitate decoding of complex instructions that require routines stored in the microcode ROM 114. A plurality of microcode ROM-control unit lines 132A and 132B connect the microcode ROM 114 to the control unit 110 and allow the microcode ROM 114 to have direct control over all the pipelines within the superscalar microprocessor.

A plurality of control-execution unit lines 134A and 134B couple the control unit 110 to the execution unit 112 which allows further decoding of the instructions and all other operations required by the microcode ROM 114 to take place in the execution unit 112. A plurality of control-FPU lines 135 connect the control unit 110 to the FPU 116 to allow implementation of floating point mathematical operations. Additionally, the control unit 110 is connected to all processor circuits in a well known manner (not shown) in order to facilitate proper timing and management of all operations.

The execution unit 112 is further connected to the FPU 116, branch target cache 108, and system memory 118. A plurality of execution-FPU lines 136A and 136B connect the execution unit 112 to the FPU 116 for execution of floating point mathematical operations such as multiplication, division, and addition. A plurality of branch verification and target address lines 146 couple the execution unit 112 to the branch target cache and allow updating of history bits that are used in branch target prediction algorithms within the branch target cache 108.

To facilitate an understanding of the operation, advantages and ramifications of the present invention, a discussion of the prior art superscalar microprocessor's operation merits a review. The operation of the prior art superscalar microprocessor 100 is based on a dual pipeline architecture.

The instruction cache 102, branch target cache 108 and prefetch buffer 104 are responsible for getting raw instructions into the execution unit 112 of the superscalar microprocessor 100. The instruction cache 102 typically contains 8 Kilobytes of memory in the form of 256 lines (or words), each line (or word) being 32-bytes in length. Generally, storage buffers located within the prefetch buffer 104 are matched to the instruction cache 102 line length, which is 32 bytes. The number of instructions contained within each 32-byte line varies with the type of instructions present therein.

Instructions are fetched from the instruction cache 102 or the system memory 118 via the bus unit 140 and the external address, data, and control buses 138A, 138B, and 138C respectively. The branch target cache 108 retains branch target addresses and stores information on whether a branch was actually taken to the target address or not in the form of history bits. The microcode ROM 114 contains microcode which controls the sequence of operations that must be performed to implement the superscalar microprocessor architecture. The microcode ROM 114 also has direct control over all pipelines in the superscalar microprocessor.

Each pipeline is comprised of five stages:

(1) Prefetch (hereinafter PF), (2) Instruction Decode (hereinafter D1), (3) Address Generate (hereinafter D2), (4) Execute—ALU and Cache Access (hereinafter EX), and (5) Write Back (hereinafter WB).

The first stage of the pipeline is the Prefetch (hereinafter PF) stage. Instructions are prefetched from the instruction cache 102 or the system memory 118. If the requested instruction line is not within the instruction cache 102, a system memory reference is made so the instruction can be retrieved from the system memory 118. In the PF stage, at least two (2) independent pairs of line size prefetch buffers (hereinafter primary prefetch buffers and alternate prefetch buffers; shown in FIG. 7) are included in the prefetch buffer 104 and operate in conjunction with the branch target cache 108. This allows one set of prefetch buffers (i.e., primary prefetch buffers) to prefetch instructions sequentially, while the other prefetch buffers (i.e., alternate prefetch buffers) prefetch according to the branch target cache 108 branch predictions. The prefetch buffers alternate their prefetch paths so that one pair is always prefetching predicted branch instructions and the other pair is prefetching sequential instructions.

The next pipeline stage is the Decode (D1) stage. Two parallel decoders (one for each pipeline), located within the instruction decoder 106 attempt to decode and issue two instructions. The decoders determine whether one or two instructions can be issued contingent upon a set of instruction pairing rules. An understanding of the pairing rules is not essential to the present disclosure and will not be discussed further.

A major function of the D1 stage is branch prediction. Branch prediction is generally implemented in the branch target cache 108 via a prediction algorithm. The branch target cache 108 is accessed in the D1 stage with the linear address of a branch target instruction. The branch target cache 108 stores a predicted target address for each branch instruction decoded. In the branch target cache 108, each branch target address has a set of history bits associated with it that are used by the branch target cache 108 branch prediction algorithm. The history bits are updated after each misprediction or correct branch prediction in the Execution stage (See infra).

The D1 stage is followed by the second Decode (D2) stage in which the address of memory resident operands are calculated. These include instructions which contain both a displacement and an immediate address, or instructions which contain a base and an index addressing mode.

The Execution (EX) stage of the pipeline is used by the processor for both ALU operations and data cache accesses. In the EX stage, all instructions in the first pipeline and all instructions in the second pipeline, except conditional branches, are verified for correct branch prediction in the branch target cache 108.

The final stage, Write Back (WB), is where instructions are enabled to modify processor states and complete execution. In this stage, the second pipeline conditional branches are verified for correct branch prediction in the branch target cache 108.

While prefetching instructions has improved the superscalar microprocessor's operation, it has not been implemented in the most energy efficient manner. The inefficiency with which prior art superscalar microprocessor's implement prefetching is exemplified by the following two scenario's, Scenario (A) and Scenario (B), which give rise to unnecessary prefetches from an instruction cache. These unnecessary prefetches increase the instruction cache bandwidth (i.e., number of accesses) and thereby increase the amount of power consumed by the superscalar microprocessor.

Figure 5A:
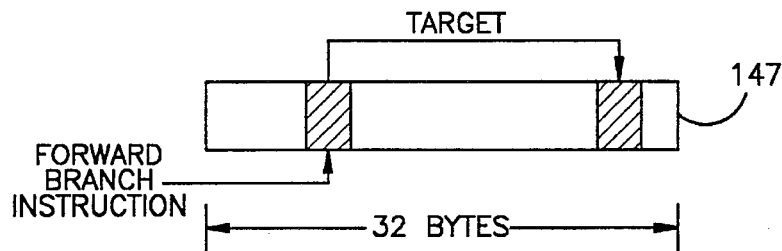
FIG. 5a is a diagram of a 32-byte instruction line containing a forward branch instruction and a branch target within the same 32-byte instruction line.
Figure 5B:
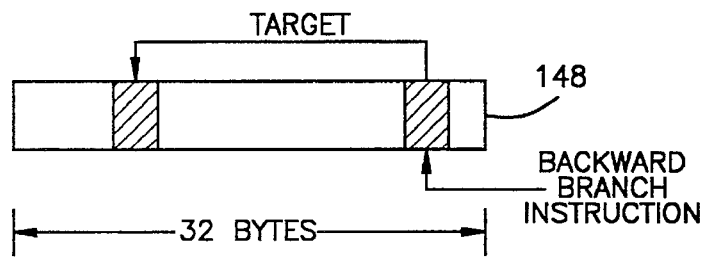
FIG. 5b is a diagram of a 32-byte instruction line containing a backward branch instruction and a branch target within the same 32-byte instruction line.

SCENARIO (A), shown in FIGS. 5a and 5b, occurs when a branch instruction and its branch target address are within the same 32-byte line (shown at 147 in FIG. 5a and 148 in FIG. 5b). In such a scenario, the 32-byte instruction line can be in either the primary prefetch buffers or the alternate prefetch buffers (See FIG. 7). Once the branch target address is decoded, the branch target cache will cause the instruction line (shown at 147 in FIG. 5a and at 148 in FIG. 5b) containing the branch target address to be loaded in the alternate prefetch buffers. Since this is the same instruction line that is already in the Primary prefetch buffers, the prefetch buffer has performed an unnecessary prefetch from the instruction cache. This unnecessary prefetch from the instruction cache has the undesirable effect of wasting power.

Figure 5C:
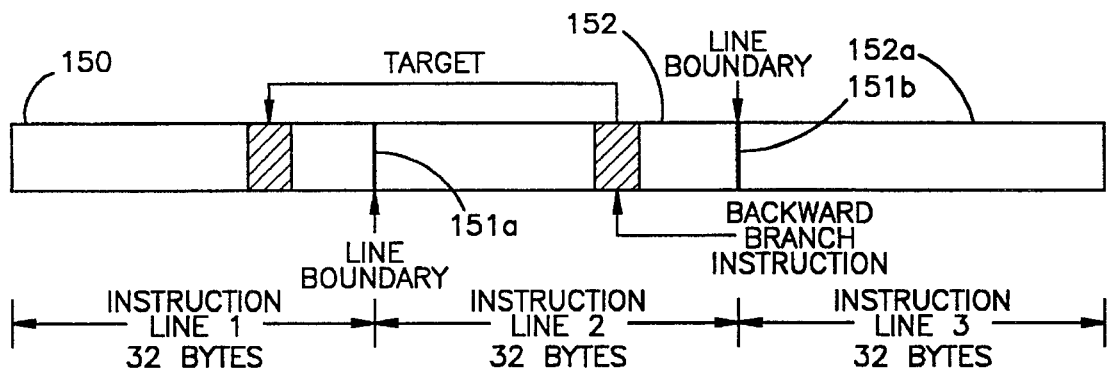
FIG. 5c is a diagram of two successive 32-byte instruction lines with the second instruction line containing a branch instruction and a branch target contained within the first instruction line.

SCENARIO (B), shown in FIG. 5c, arises when a branch instruction in one 32-byte line 152, has a branch target address that falls within the preceding 32-byte line 150. In this scenario, the Primary prefetch buffers initially contain instruction lines 150 and (See discussion of the PF stage, supra). Once the decoder crosses the line boundary 151a, the next subsequent instruction line 152a is fetched and replaces instruction line 150 in the Primary prefetch buffers. After the branch target address is decoded, the branch target cache will cause instruction line 150 to be loaded into the Alternate prefetch buffers (because it contains the branch's target) along with the next subsequent instruction line, i.e. instruction line 152. Since initially instruction line 150 was present in the Primary prefetch buffers, the prefetch buffer has performed 3 unnecessary prefetches. Thus, in SCENARIO (A), the instruction cache has been accessed to retrieve information which was already present in the prefetch buffers, and in SCENARIO (B), a prefetch was done that had overwritten an instruction line that was desired to remain in the prefetch buffers. In SCENARIO (B), if instruction line 150 had not been overwritten by the next subsequent instruction line, the required instruction lines would have been present in the prefetch buffers. The processor has, thereby, wasted energy retrieving information from the instruction cache to the prefetch buffers when the prefetch buffers had contained the required information.

Under the present invention, the prior art superscalar microprocessor is modified so that prefetching of instructions from the instruction cache, when such instruction are already within the prefetch buffers, is eliminated. By eliminating unnecessary accesses to the instruction cache, the cache bandwidth (i.e. number of instruction cache accesses) is reduced. A reduction in the cache bandwidth results in a reduction in the amount of power that a superscalar microprocessor consumes while in operation because the number of instruction cache accesses if significantly reduced.

Figure 6:
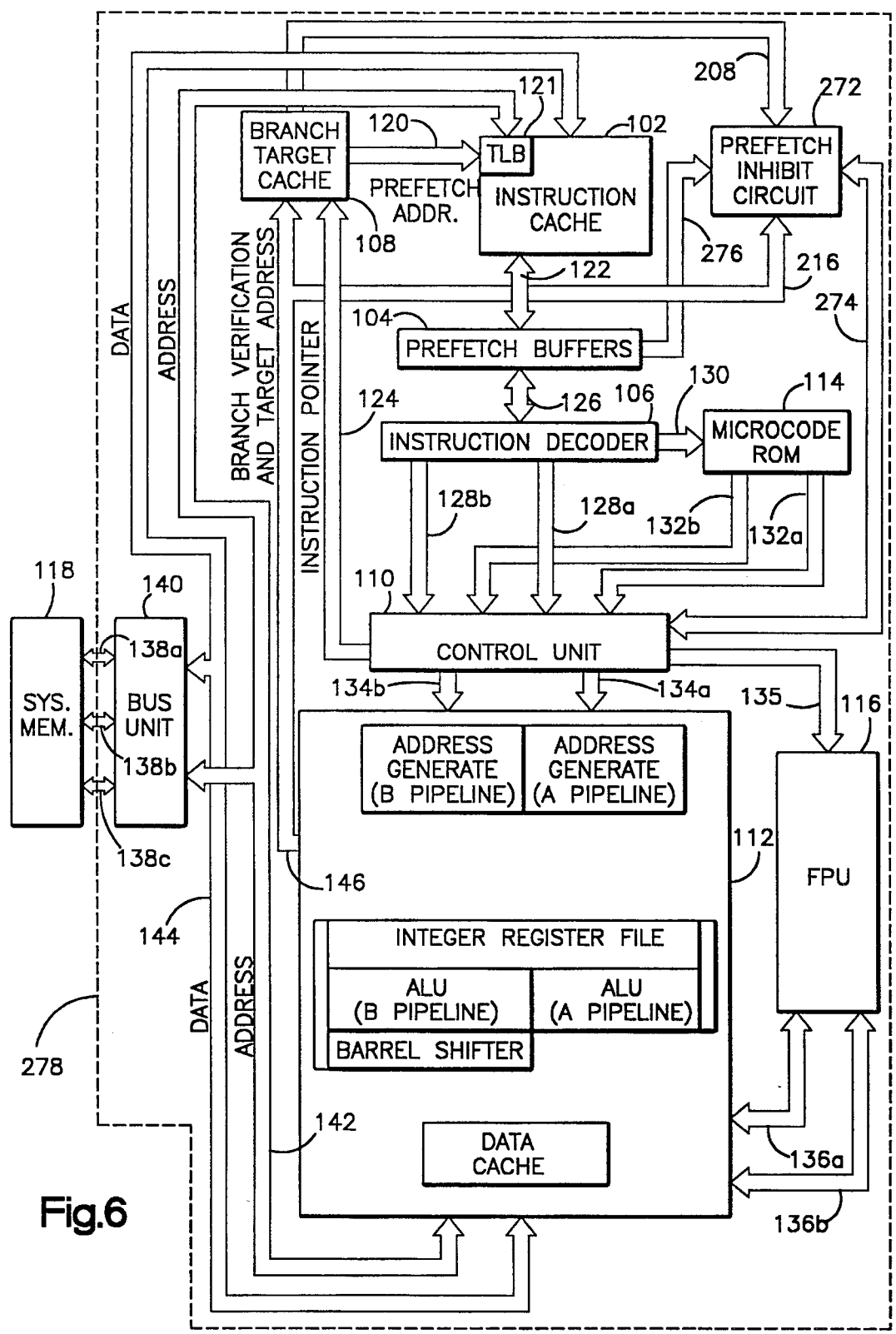
FIG. 6 is a block diagram of certain components included within the enhanced superscalar microprocessor of the present invention.

Reference is now had to FIG. 6, where an enhanced superscalar microprocessor is shown at 278 incorporating one embodiment of the present invention at 272. Since the illustrated embodiment of the present invention is incorporated into a generic superscalar microprocessor, many of the connective and operational descriptions previously discussed for the prior art superscalar microprocessor are applicable to the present description of the illustrated embodiment. Accordingly, the present discussion will now focus on the particulars of the illustrated embodiment and the enhancements created thereby.

In FIG. 6, a prefetch inhibit circuit 272 is in circuit communication with a branch target cache 108, prefetch buffers 104, control unit 110, and execution unit 112. A plurality of prefetch target address lines 208 connect the prefetch inhibit circuit 272 to the branch target cache 108 whereby branch target addresses are input into the prefetch inhibit circuit 272 for analysis. A plurality of buffer-inhibit circuit lines 276 couple the prefetch buffers 104 to the prefetch inhibit circuit 272 whereby the contents of the prefetch buffers 104 directed into the prefetch inhibit circuit 272. A plurality of prefetch inhibit-control unit lines 274 couple the control unit 110 to the prefetch inhibit circuit 272 whereby operations within the prefetch inhibit circuit 272 are made responsive to certain signals within the control unit 110 (as will be presently described). A plurality of execution unit target address lines 216 couple the execution unit 112 to the prefetch inhibit circuit 272 whereby branch verification and target addresses generated by the execution unit 112 are input into the prefetch inhibit circuit 272 for analysis.

Figure 7:
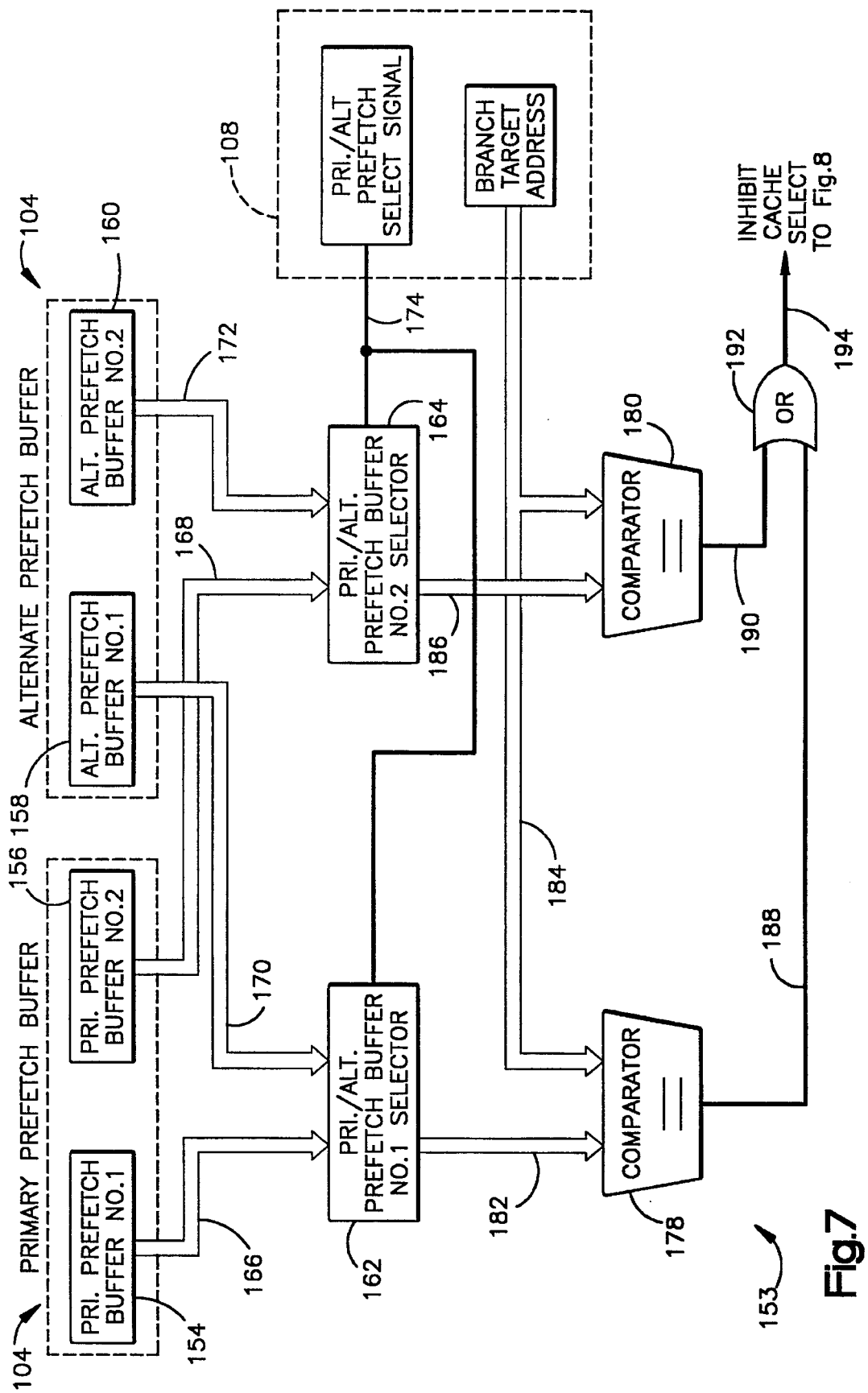
FIG. 7 is a block diagram of a first portion of a prefetch inhibit circuit of the present invention.

Illustrated in FIG. 7 is a functional block diagram of a first portion 153 of the illustrated embodiment of the prefetch inhibit circuit 272 of the present invention. First portion 153 is designed to eliminate unnecessary prefetches from the instruction cache when (1) a forward or backward branch has a target address that falls within the same 32-byte line (SCENARIO (A), above), and (2) a forward branch has a target address that is contained within the next successive 32-byte line and that line has already been brought into the prefetch buffers.

Referring to FIG. 7, first portion 153 includes a first primary prefetch buffer, shown at 154, in circuit communication with a first selector 162 via a plurality of first primary prefetch buffer output lines 166. Similarly, a first alternate prefetch buffer, shown at 158, is in circuit communication with first selector 162 via a plurality of first alternate prefetch buffer No. 1 output lines 170. A second primary prefetch buffer, shown at 156, is in circuit communication with a second selector 164 via a plurality of second primary prefetch buffer output lines 168. Similarly, a second alternate prefetch buffer, shown at 160, is in circuit communication with the second selector 164 via a plurality of second alternate prefetch buffer output lines 172. A primary/alternate prefetch buffer select signal 174 couples the branch target cache 108 to first selector 162 and second selector 164 whereby data selection is achieved.

A first comparator 178 is in circuit communication with the first selector 162 and the branch target cache 108. A plurality of first selector output lines 182 channel the data selected by the first selector 162 into the first comparator 178. A plurality of branch target address lines 184 route a branch target address into the first comparator 178 from the branch target cache 176. In a similar fashion, a second comparator 180 is electrically coupled to the second selector 164 and the branch target cache 176. A plurality of second selector output lines 186 channel the data selected by the second selector 164 into the second comparator 180. The branch target address is also routed into the second comparator 180 via the plurality of branch target address lines 184.

A two-input OR gate 192 receives the output of first comparator 178 and second comparator 180 via a first comparator output line 188 and second selector output line 190. An inhibit cache select line 194 carries the output of the two-input OR gate 192 to the instruction cache 102 (shown in FIG. 6) and to a first inverter gate 228 (shown in FIG. 8).

Figure 8:
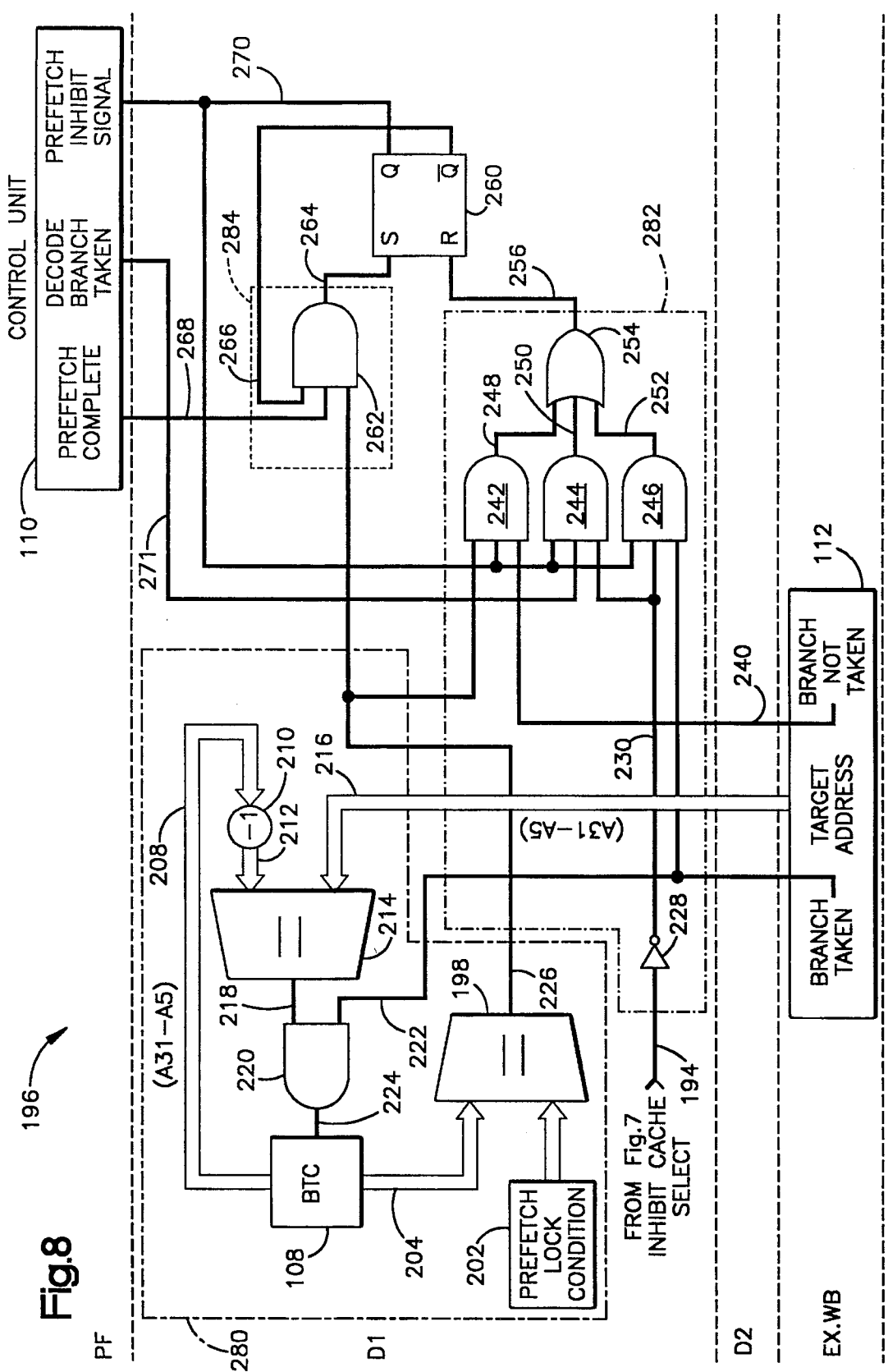
FIG. 8 is a block diagram of a second portion of the prefetch inhibit circuit of the present invention.

Illustrated in FIG. 8 is a schematic block diagram of a second portion 196 of the prefetch inhibit circuit 272 of the present invention. Second portion 196 is designed to eliminate unnecessary prefetches from the instruction cache that fall within SCENARIO (B), above (shown in FIG. 5c). Second portion 196 uses the concept of prefetch locking to disable the superscalar microprocessor from prefetching instructions until the prefetch lock is disabled.

Referring to FIG. 8, second portion 196 includes a prefetch lock analysis circuit 280, prefetch lock reset circuit 282, prefetch lock circuit 284, and an R-S latch 260. The prefetch lock analysis circuit 280 includes a comparator 198, subtractor 210, comparator 214, AND gate 220 and various interconnections (to be described presently). The prefetch lock reset circuit 282 includes an inverter gate 228, three-input AND gates 242, 244 and 246, a two-input OR gate 254, and interconnections therebetween (to be presently described). The prefetch lock circuit 284 includes a three-input AND gate 262. Said circuits and latch are interconnected as shown in FIG. 8 to each other and to the instruction cache 102, control unit 110, execution unit 112 and branch target cache 108. Also shown in FIG. 8 are the pertinent pipeline stages where various functions are accomplished by the enhanced superscalar microprocessor of the present invention.

In all of the operational descriptions that follow, the initial state of each line is LOW and all of the address lines and buffers are empty. Also, Positive Logic (i.e. the Positive or HI state is equivalent to a logic level of "1" and the more Negative or LOW state is equivalent to a logic level "0") is employed to assist in the understanding of the present invention's operation. The use of Positive logic should not be interpreted as limiting, for Negative Logic (i.e. the Positive or HI state is equivalent to a logic level of "0" and the more Negative or LOW state is equivalent to a logic level of "1") can also be used in the description and implementation of the illustrated embodiment.

Figure 5D:
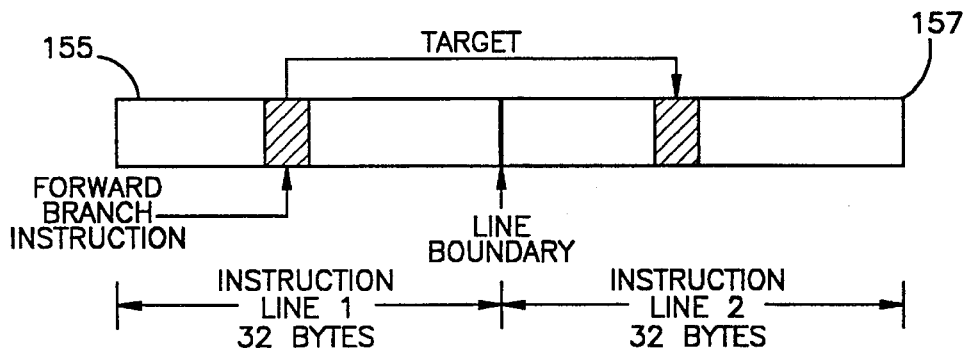
FIG. 5d is a diagram of two successive 32-byte instruction lines with the first instruction line containing a branch instruction and a branch target contained within the second instruction line.

Referring now to FIGS. 5a, 5b, and 5d, first portion 153 (shown in FIG. 7) is designed to eliminate unnecessary prefetches from the instruction cache when (1) a forward or backward branch has a target address that falls within the same 32-byte instruction line (shown in FIGS. 5a and 5b), and (2) a forward branch has a target address that points to the next successive 32-byte instruction line (shown in FIG. 5d) and that line has already been brought into the prefetch buffers.

Referring now to FIGS. 5a, 5b, and 7, 32-byte instruction lines 147 and 148 are handled identically by first portion 153, and can be present in either the Primary prefetch buffers 154 and 156 or the alternate prefetch buffers 158 and 160. Thus, the present discussion will focus on when instruction line 147 is present within primary prefetch buffers 154 and 156.

Once instruction line 147 has been brought into the prefetch buffers, it is decoded by the instruction decoder. Since instruction line 147 contains a forward branch instruction, the branch instruction will be decoded along with the branch's target address. Once the branch target address is generated, it is sent to the branch target cache 108. Because the primary prefetch buffers are currently being utilized, the primary/alternate prefetch buffer select line 174 is LOW and the output of first selector 162 and second selector 164 to contain the contents of Primary prefetch buffer 154 and 156 at output lines 182 and 186 (See TABLE 1 infra).

TABLE 1

Data Selector 162 and 164 Output Definitions

| Pri./Alt. Prefetch Butter Select line 174 | Output of First Selector 162 at 182 | Output of Second Selector 164 at 186 |
|---|---|---|
| LOW | Contents of primary Prefetch butter No. 1 | Contents of primary Prefetch butter No. 2 |
| HI | Contents of alternate Prefetch butter No. 1 | Contents of alternate Prefetch butter no. 2 |

The contents of prefetch buffers 154 and 156 are now input into the first comparator 178 and second comparator 180 and compared to the branch target address present on the branch target address lines 184. If the branch target address is contained within primary prefetch buffer 154 then the first comparator output line 188 is driven HI causing the inhibit cache select line 194 at the output of the two input OR gate 192 to be driven HI. If the branch target is contained within primary prefetch buffer 156 then the second comparator output line 190 is driven HI causing the inhibit cache select line 194 at the output of the two input OR gate 192 to be driven HI. The inhibit cache select line 194 disables the instruction cache so that no prefetching can occur.

If the instruction line 147 is present within the alternate prefetch buffers 158 and 160, the circuit operation is identical to the preceding discussion of the primary prefetch buffers. In brief, the contents of alternate prefetch buffers 158 and 160 are selected to appear at the outputs of selectors 162 and 164 (See TABLE 1 supra) and then are compared to the branch target address by the comparators 178 and 180. If the branch target address is contained within one of the alternate prefetch buffers 158 or 160, the inhibit cache select line 194 at the output of the two-input OR gate 192 will be driven HI thereby disabling any prefetching.

Referring now to FIGS. 5d and 7, the situation can arise when a forward branch has a target address that points to a next successive instruction line 157 and line 157 has already been brought into the prefetch buffers. In such a situation, first portion 153 will disable prefetching since the required instruction line is already present within the prefetch buffers. Such a situation arises when instruction line 155 is present in either (1) the primary prefetch buffer 154, and line 157 has already been brought into the primary prefetch buffer 156, or (2) the instruction line 155 is present in the alternate prefetch buffer 158, and the instruction line 157 has already been brought into the alternate prefetch buffer 160.

First portion 153 treats the primary prefetch buffers and the alternate prefetch buffers in an analogous fashion and thus, the present discussion will focus on the primary prefetch buffers. Since prefetching is achieved by fetching successive blocks of instruction lines from an instruction cache, the instruction line 155 can be loaded into the primary prefetch buffer 154, which will cause the next succeeding instruction line 157 to be loaded into the primary prefetch buffer 156 (in accord with the processor's prefetching operations).

Since the instruction line 155 contains a forward branch instruction, the branch instruction will be decoded along with the branch's target address. Once the branch target address is generated, it is sent to branch target cache 108. Since the primary prefetch buffers are currently being utilized, the primary/alternate prefetch buffer select line 174 is LOW and the output of first selector 162 and second selector 164 contain the contents of primary prefetch buffer 154 and 156 at the selector output lines 182 and 186 (See TABLE 1, supra).

The contents of prefetch buffers 154 and 156 are now input into the first comparator 178 and second comparator 180 and are compared to the branch target address present on the branch target address lines 184. Since the branch target is contained within the primary prefetch buffer 156, the second comparator output line 190 is driven HI causing the inhibit cache select line 194 at the output of the two-input OR gate 192 to be driven high. Prefetching is now disabled. In the illustrated embodiment, the inhibit cache select line 194 is connected directly to a prefetch buffer unit, or an instruction cache.

Referring now to FIGS. 5c, 7, and 8, second portion 196 is designed to eliminate prefetches when a branch instruction in one instruction line 152, has a branch target address that falls within a preceding instruction line 150. When such a situation arises, the second portion 196 will inhibit prefetching and thereby conserve energy.

The second portion 193 treats the primary prefetch buffers and the alternate prefetch buffers in an analogous fashion and thus, the present discussion will focus only on the primary prefetch buffers. The instruction line 150 can be loaded into the primary prefetch buffer 154 and then the next successive instruction line 152 would be loaded into the primary prefetch buffer 156 (Step 1 in TABLE 2, infra). The instruction line 150 would be decoded by the instruction decoder (not shown) and executed, followed by instruction line 152. As part of the processor's normal operations, when the decoder crosses the line boundary 151a, a prefetch is requested for a next successive instruction line 152a, which is loaded into the primary prefetch buffer 154 and replaces instruction line 150 (Step 2 in TABLE 2, infra).

Since the instruction line 152 contains a backward branch instruction, who's target address is contained in the preceding instruction line 150, the second portion 196 would detect this and set the Prefetch Lock Condition within the branch target cache, also the instruction lines 151 and 152 would be loaded into the alternate prefetch buffers 158 and 160 (See Step 3, TABLE 2, infra). A branch target address is generated in the EX stage by the execution unit 112 and input into the comparator 214 via a target address bus 216.

TABLE 2

| | PREFETCH BUFFERS 154, 156, 158, and 160 contents | | | |
|---|---|---|---|---|
| Step | Contents of Primary Prefetch butter 154 | Contents of Primary Prefetch butter 156 | Contents of Primary Prefetch butter 158 | Contents of Primary Prefetch butter 160 |
| 1 | Inst. line 150 | Inst. line 152 | Empty | Empty |
| 2 | Inst. line 152a | Inst. line 152 | Empty | Empty |
| 3 | Inst. line 152a | Inst. line 152 | Inst. line 150 | Inst. line 152 |
| 4 | Inst. line 152a | Inst. line 152 | Inst. line 152a | Inst. line 152 |
| 5 | Inst. line 150 (LOCK) | Inst. line 152 (LOCK) | Inst. line 152a (LOCK) | Inst. line 152 (LOCK) |

The address of the current instruction line 152 (stored in alternate prefetch buffer 160) is placed on the prefetch target address bus 208 where the subtractor 210 subtracts the address value by one and inputs this value into the comparator 214. An output line 218 of the comparator 214 is driven HI if the address of the instruction line containing the target equals the preceding instruction line address (which is the instruction line currently stored in the alternate prefetch buffer 158) and is input into the AND gate 220. If a branch to the target instruction line address is actually taken, the execution unit 112 drives a branch taken line 222 HI which is input into the AND gate 220. When the output lines 218 and 222 are both driven HI, an output line 224 of the AND gate 220 is also driven HI and input into the branch target cache 108.

When the output line 224 is driven HI, a Set Prefetch Lock Condition function within the branch target cache 108 is triggered. The Set Prefetch lock Condition function comprises a simple state machine within the branch target cache that advances the state of a pair of history bits. At least one backward branch to a target address in the previous instruction line is required before the history bits are set to a predefined value to indicate that a prefetch lock condition is present.

The decoder would continue to process instruction line 150 from alternate prefetch buffer 158 until the line boundary 151a is crossed, where a new prefetch request would be generated for the successive instruction line 152a. The instruction line 152a would replace the instruction line 150 and be loaded into alternate prefetch buffer 158 (See Step 4, TABLE 2, infra). When the decoder encounters the backward branch for the second time in instruction line 152, the second portion 196 will set the Prefetch Inhibit Signal 270 after the prefetch of the target address is completed. The history bits are input into the comparator 198 via a history bit bus 204 and are compared to a predefined, constant, prefetch lock condition value 202. Since the history bits have been set equal to the prefetch lock condition 202 by the branch target cache 108, the comparator 198 drives an output line 226 HI, which is input into the prefetch lock reset circuit 282 and the prefetch lock circuit 284. Since the Prefetch Inhibit Signal 270 is LOW, the AND gates 242, 244, and 246 will block the resetting of latch 260, and enable the AND gate at 262. Because the output line 226 of the comparator 198 is HI when a branch target is prefetched, and the prefetch complete line 268 is driven HI when the prefetch is complete, and latch 260 output line (Q') 266 is HI, the AND gate 262 drives its output line 264 HI and thereby causes the latch 260 to change states as shown in line 2 of TABLE 3, infra. While the Prefetch Inhibit signal line (Q) 270 is HI, a prefetch lock function in the control unit 110 is now initiated and no further prefetching will be done. With the Prefetch Inhibit Signal line (Q) 270 HI, the output line (Q') 266 is driven LOW thereby causing the AND gate 262 to drive its output line 264 LOW. The S input of the R-S latch 260 is now LOW and the Prefetch Inhibit Signal line (Q) 270 remains HI (See line 1, TABLE 3, supra). The instruction line 150, which contains the branch target, is the last line to be placed in the primary prefetch buffer 152 before the prefetch lock condition occurs (See Step 5, TABLE 2, supra).

TABLE 3

| R-S Latch 260 Output states | | | |
|---|---|---|---|
| S | R | Q | Q' |
| LOW | LOW | NO CHANGE | NO CHANGE |
| HI | LOW | HI | LOW |
| LOW | HI | LOW | HI |
| HI | HI | NOT ALLOWED | NOT ALLOWED |

Prefetching of instructions from the instruction cache will remain disabled until the backward instruction loop terminates. As shown in Step 5 of TABLE 2, supra, the primary and alternate prefetch buffers are now locked because the required instruction lines 150 and 152 are within the prefetch buffers.

The prefetch lock reset circuit 282 determines when the prefetch lock should be disabled so that normal prefetching may resume. A reset of the prefetch lock will occur under any of the following conditions:

(1) The history bits for a branch are set to the prefetch lock condition and the execution unit determined that the branch was not taken;

(2) The decoder, using the branch target cache, predicts that a branch is taken and the target is outside of the prefetch buffer;

(3) The execution unit determines that a branch is taken and the target is outside of the prefetch buffers.

Resetting of the prefetch lock will cause the next requested instruction line from the instruction cache to be loaded into the prefetch buffers.

Reset under the first condition: the output line 226 of the comparator 198 is driven HI when the branch target's history bits from the branch target cache 108 are equal to the prefetch lock condition 202. The Output line 226 is input to the three-input AND gate 242. The second input of AND gate 242 is the Prefetch Inhibit Signal 270 which is connected to the latch 260 and the control unit 110. The third input of the AND gate 242 is a branch not taken line 240 which is connected to the execution unit 112. The execution unit 112 drives the branch not taken line 240 HI when a branch to the target address did not occur, causing the AND gate 242 to drive its output line 248 HI. When the output line 248 is driven HI, the three-input OR gate 254 drives its output line 256 HI. The output line 256 is connected to the R input of R-S latch 260. When the R input is driven HI, the R-S latch 260 drives the Prefetch Inhibit Signal line (Q) 270 LOW (since the S input has been driven LOW previously). The prefetch lock is now disabled and the prefetching of instructions may resume.

Reset under the second condition: A decode branch taken signal line 271, from the control unit 110 is driven HI (indicating the decoder, using the branch target cache, predicts that an instruction will cause a branch), and is couple to an input on the three-input AND gate 244.

When the inhibit cache select line 194, from the first portion 153 is LOW (indicating that prefetching is not disabled by the first portion 153), the inverter gate 228 drives its output line 230 HI, which is also coupled to an input on the three-input AND gate 246.

The Prefetch Inhibit Signal line 270 is HI (indicating that a reset of the Prefetch Inhibit Signal would be allowed), and is coupled to a third input on the three-input AND gate 244. With all three inputs HI (lines 230, 270, and 271), the three-input AND gate 244 drives its output line 250 HI and thereby causes the three-input OR gate 254 to drive its output line 256 HI. The output line 256 is connected to the R input of R-S latch 260. When the R input is driven HI, R-S latch 260 drives the prefetch inhibit signal line (Q) 270 LOW (since the S input has been driven LOW previously). The prefetch lock is now disabled and prefetching of instructions may resume.

Reset under the third condition: The branch taken line 222 is coupled to an input on the three-input AND gate 246 and is driven HI by the execution unit 112 when a branch is actually taken to the branch target address.

When the inhibit cache select line 194, from the first portion 253 is LOW (indicating that prefetching is not disabled by the first portion 153), the inverter gate 228 drives its output line 230 HI, which is also coupled to an input on the three-input AND gate 246.

The Prefetch Inhibit Signal line 270 is HI (indicating that a reset of the Prefetch Inhibit Signal would be allowed), and is coupled to a third input on the three-input AND gate 246. With all three inputs HI (lines 222, 230, and 270), the three-input AND gate 246 drives its output line 252 HI and thereby causes the three-input OR gate 254 to drive its output line 256 HI. The output line 256 is connected to the R input of R-S latch 260. When the R input is driven HI, R-S latch 260 drives the Prefetch Inhibit Signal line (Q) 270 LOW (since the S input has been driven LOW previously). The prefetch lock is now disabled and prefetching of instructions may resume.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the 32-byte instruction line length and the number of prefetch buffers may be varied and the circuit adapted thereto. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A microprocessor for use in a computer system having a system memory comprising:

(a) an instruction decoder configured to decode processor instructions into codes suitable for causing execution of the instructions by said microprocessor;

(b) a branch target cache configured to store branch target information and further configured to present branch target information responsive to said instruction decoder determining that an instruction is a branching instruction having a branch target;

(c) an instruction cache in circuit communication with said branch target cache and configured to store at least one block of code comprised of a plurality of instruction lines wherein each instruction line comprises at least one instruction read from the system memory;

(d) a prefetch buffer in circuit communication with said instruction decoder and said instruction cache and configured to store at least a first processor instruction line and a second processor instruction line copied from either said instruction cache or the system memory;

(e) a control circuit in circuit communication with said instruction decoder and configured to prefetch blocks of code from said system memory to said instruction cache and further configured to copy instructions from said instruction cache to said prefetch buffer; and (f) a prefetch inhibit circuit in circuit communication with said prefetch buffer, said branch target cache, said control circuit, and an execution circuit and configured to generate a prefetch inhibit signal responsive to the contents of said prefetch buffer and branch target information determining that the branch target information is in one of said instructions in said prefetch buffer;

wherein said control circuit is further configured to inhibit prefetches from the instruction cache to the prefetch buffer responsive to said prefetch inhibit signal generated by said prefetch inhibit circuit while allowing the execution circuit to continue executing instructions from the prefetch buffer.

2. The microprocessor of claim 1 wherein said prefetch inhibit circuit is configured to assert said prefetch inhibit signal responsive to said first instruction line containing a branching instruction and the branch target information indicating that said first instruction line in said prefetch buffer is the branch target of said branching instruction.

3. The microprocessor of claim 1 wherein said prefetch inhibit circuit is configured to assert said prefetch inhibit signal responsive to said second instruction line containing a branching instruction and the branch target information indicating that said second instruction line in said prefetch buffer is the branch target of said branching instruction.

4. The microprocessor of claim 1 wherein said prefetch inhibit circuit is configured to assert said prefetch inhibit signal responsive to said first instruction line containing a branching instruction and the branch target information indicating that said second instruction line in said prefetch buffer is the branch target of said branching instruction.

5. The microprocessor of claim 1 wherein said prefetch inhibit circuit is further configured to assert said prefetch inhibit signal responsive to said second instruction line containing a branching instruction and the branch target information indicating that said first instruction line in said prefetch buffer is the branch target of said branching instruction.

6. The microprocessor of claim 2 wherein said prefetch inhibit circuit is further configured to assert said prefetch inhibit signal responsive to said second instruction line containing a branching instruction and the branch target information indicating that said first instruction line in said prefetch buffer is the branch target of said branching instruction.

7. The microprocessor of claim 3 wherein said prefetch inhibit circuit is further configured to assert said prefetch inhibit signal responsive to said second instruction line containing a branching instruction and the branch target information indicating that said first instruction line in said prefetch buffer is the branch target of said branching instruction.

8. The microprocessor of claim 4 wherein said prefetch inhibit circuit is further configured to assert said prefetch inhibit signal responsive to said second instruction line containing a branching instruction and the branch target information indicating that said first instruction line in said prefetch buffer is the branch target of said branching instruction.

9. A computer system having a microprocessor and a system memory, wherein said microprocessor comprises a branch target cache, a prefetch buffer, an execution unit, a control unit and a prefetch inhibit circuit in circuit communication with said branch target cache, prefetch buffer, execution unit, and control unit, wherein (a) said prefetch buffer is comprised of at least one branch instruction having a branch target, and (b) said prefetch inhibit circuit is comprised of combinational logic configured to determine if the branch target is in said prefetch buffer and to assert a prefetch inhibit signal responsive to said determination indicating that the branch target is in said prefetch buffer.

10. The computer system of claim 9 wherein said branch target cache is configured to store branch target information and further configured to present branch target information responsive to an instruction decoder determining that an instruction is a branching instruction having a target instruction.

11. The computer system of claim 10 wherein said prefetch inhibit circuit further comprises a first portion configured to assert said prefetch inhibit signal responsive to an instruction line comprising said branching instruction and said target instruction.

12. The computer system of claim 10 wherein said prefetch inhibit circuit further comprises a first portion configured to assert said prefetch inhibit signal responsive to a first instruction line comprising said branching instruction and a second successive instruction line comprising said target instruction.

13. The computer system of claim 10 wherein said prefetch inhibit circuit further comprises a second portion configured to assert said prefetch inhibit signal responsive to said second successive instruction line comprising a branching instruction and the branch target information indicating that said first instruction line is comprised of said target instruction.

14. A method for reducing the power consumed in a microprocessor having a branch target cache which stores branch target information, an instruction cache, an instruction decoder, an execution circuit and a prefetch buffer and for use in a computer system having a system memory, comprising the steps of:

(a) prefetching a block of code containing instructions from the system memory to the instruction cache;

(b) prefetching a plurality of instructions from the instruction cache to the prefetch buffer;

(c) decoding at least one of the plurality of instructions;

(d) accessing the branch target cache to determine branch target information responsive to the at least one decoded instruction being a branch instruction to a target instruction;

(e) determining if the target instruction is included in the plurality of instructions in said prefetch buffer;

(f) inhibiting prefetches from the instruction cache to the prefetch buffer responsive to the branch target information indicating that said plurality of instructions in said prefetch buffer includes the target instruction; and (g) executing said plurality of instructions for so long as the branch target information indicates that the plurality of instructions in said prefetch buffer includes the target instruction.

15. A method for reducing the power consumed in a microprocessor having a branch target cache which stores branch target information, an instruction cache, an instruction decoder, an execution circuit and a prefetch buffer and for use in a computer system having a system memory comprising the steps of:

(a) prefetching a plurality of instructions from the instruction cache to the prefetch buffer;

(b) decoding at least one of the instructions;

(c) accessing the branch target cache to determine branch target information responsive to the at least one decoded instruction being a branch instruction to a target instruction;

(d) determining if the target instruction is included in the plurality of instructions in said prefetch buffer;

(e) inhibiting prefetches from the instruction cache to the prefetch buffer responsive to the branch target information indicating that said plurality of instructions in said prefetch buffer includes the target instruction; and (f) executing said plurality of instructions for so long as the branch target information indicates that the plurality of instructions in said prefetch buffer includes the target instruction.

16. The method for reducing the power consumed in a microprocessor as recited in claim 15, wherein the step of accessing the branch target cache comprises setting a pair of history bits responsive to the execution circuit branching to the target instruction.

17. A method for reducing the power consumed in a microprocessor having a branch target cache, instruction cache, instruction decoder, execution circuit and a prefetch buffer and for use in a computer system having a system memory comprising the steps of:

(a) prefetching a plurality of instruction lines, comprising a first and second instruction line, from the instruction cache to the prefetch buffer;

(b) decoding the second instruction line into at least one branch instruction having a target instruction;

(c) accessing the branch target cache to determine branch target information responsive to the target instruction;

(d) altering the branch target information responsive to said execution unit executing the decoded branch instruction;

(e) determining if the branch target information indicates that said execution will branch to said target instruction;

(f) inhibiting prefetches from the instruction cache to the prefetch buffer responsive to the branch target information indicating that said plurality of instruction lines in said prefetch buffer includes the target instruction; and (g) executing said plurality of instruction lines in said prefetch buffer for so long as the branch target information indicates that the plurality of instruction lines in said prefetch buffer include the target instruction.

18. The method for reducing the power consumed in a microprocessor as recited in claim 17, wherein the step of altering the branch target information comprises setting a pair of history bits responsive to the execution circuit branching to the target instruction.

19. The method of reducing the power consumed in a microprocessor as recited in claim 17, wherein the step of determining if the branch target information indicates that said execution will branch to said target instruction comprises comparing the history bits to a predefined value indicating that said execution will branch to said target instruction.

* * * * *